United States Patent [19]

Lonsway

[11] Patent Number: 5,529,016
[45] Date of Patent: Jun. 25, 1996

[54] ANIMAL TOY

[76] Inventor: Gene A. Lonsway, 1676 Airport Rd., Chapel Hill, N.C. 27514

[21] Appl. No.: 495,935

[22] Filed: Jun. 28, 1995

[51] Int. Cl.⁶ .......................... A01K 29/00; A63B 67/00
[52] U.S. Cl. ........................................ 119/707; 273/342
[58] Field of Search ............................ 119/707; 273/342

[56] References Cited

U.S. PATENT DOCUMENTS

| | | | |
|---|---|---|---|
| 2,275,179 | 3/1942 | Heil | 273/342 X |
| 5,207,432 | 5/1993 | Miller | 273/342 X |
| 5,460,382 | 10/1995 | Loritz | 273/342 |

*Primary Examiner*—William H. Grieb
*Attorney, Agent, or Firm*—Richard E. Jenkins

[57] ABSTRACT

A dog toy for providing an unpredictable bounce to a ball and comprising a ball target base element with a generally cylindrical circumference. The top surface of the ball target base element is formed from a multiplicity of planar target areas wherein each planar target area defines a different plane than the other planar target areas. The multiplicity of planar target areas includes a plurality of upwardly inclined planar target areas extending generally toward the central portion of the ball target base element and a plurality of generally downwardly inclined planar target areas and a horizontal planar target area defined by the lowermost edges of the inclined planar target areas in the central portion of the top surface of the ball target base element.

19 Claims, 2 Drawing Sheets

ANIMAL TOY

TECHNICAL FIELD

The present invention relates to animal toys, and more particularly to a bounce pad for providing an unpredictable bounce to a ball thrown thereagainst in order to provide an exciting ball chasing game for a dog.

1. Related Art

As dog owners are well aware, dogs greatly enjoy chasing after a ball and attempting to catch the ball. Also, as dog owners are aware, most dogs enjoy the chase even more if the ball takes an unpredictable bounce or the path of the ball is other than anticipated by the dog.

Although a ball may be thrown against a wall or many other types of objects in order to temporarily baffle the dog, this puzzle of where the ball will go is soon solved by the dog. Applicant is not aware of any product designed specifically to provide a multiplicity of potential ball bounce angles when a ball impacts the object. Specifically, applicant is not aware of a product adapted to allow the thrower of a ball to impact a specific surface area of a bounce pad in order to provide a bounce angle which is predictable to the thrower of the ball but unpredictable to the dog waiting for the ball to bounce off the object. Applicant believes that there is long-felt need for such a novel product for dog owners to utilize in playing a dog's favorite game of chasing a bouncing ball or the like.

2. Disclosure of the Invention

In accordance with the present invention, applicant provides a dog toy for giving an unpredictable bounce to a ball thrown thereagainst by a person playing with the dog. The dog toy comprises a ball target base element which has a generally cylindrical circumference and a top surface that defines a plurality of planar target areas wherein each planar target area defines a different plane than the others. The plurality of planar target areas include both a plurality of generally upwardly inclined planar target areas extending generally toward the central portion of the ball target base element that comprise the preponderance of the top surface area as well as a plurality of generally downwardly inclined planar target areas located generally in the central portion of the top surface of the ball target base element.

It is therefore the object of the present invention to provide a dog toy that gives a multiplicity of bounce angles to a ball thrown thereagainst.

It is another object of the present invention to provide a dog toy that provides a multiplicity of different bounce angles to a ball thrown thereagainst that are predictable to the ball thrown but unpredictable to a dog so as to enhance the dog's excitement in chasing a ball.

Some of the objects of the invention having been stated hereinabove, other objects will become evident as the description proceeds, when taken in connection with the accompanying drawings as best described hereinbelow.

Best Mode for Carrying Out the Invention

Figure 1:
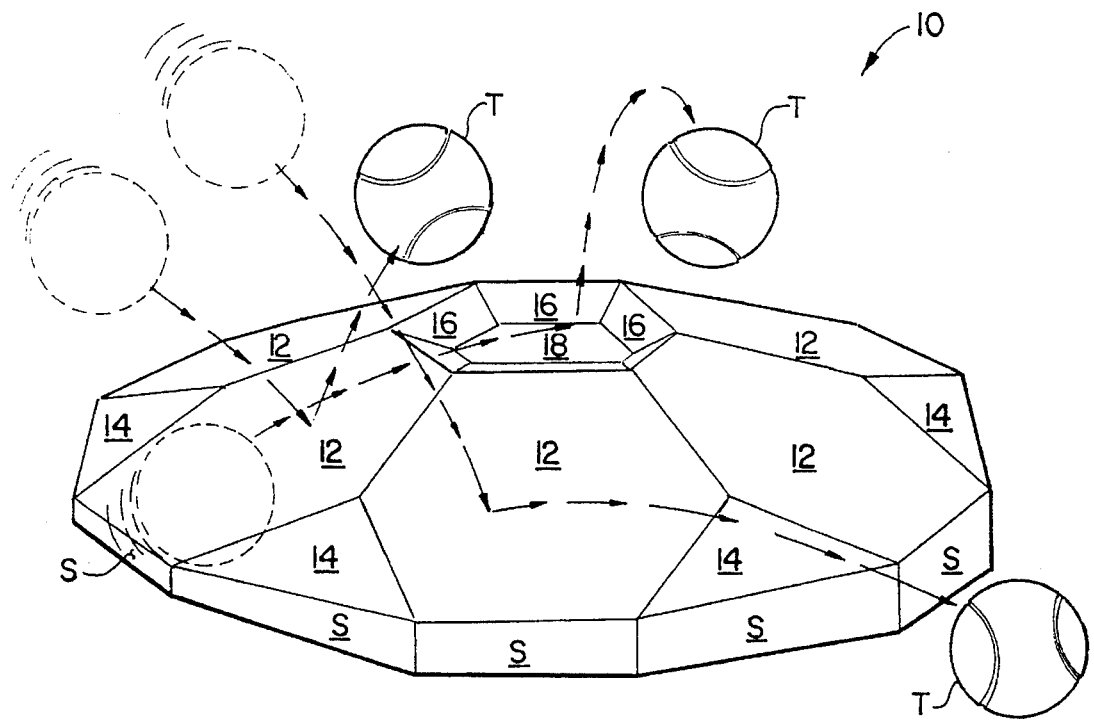
FIG. 1 is a perspective view of the dog toy of the present invention illustrating several of the different angles at which a ball will be deflected therefrom.
Figure 2:
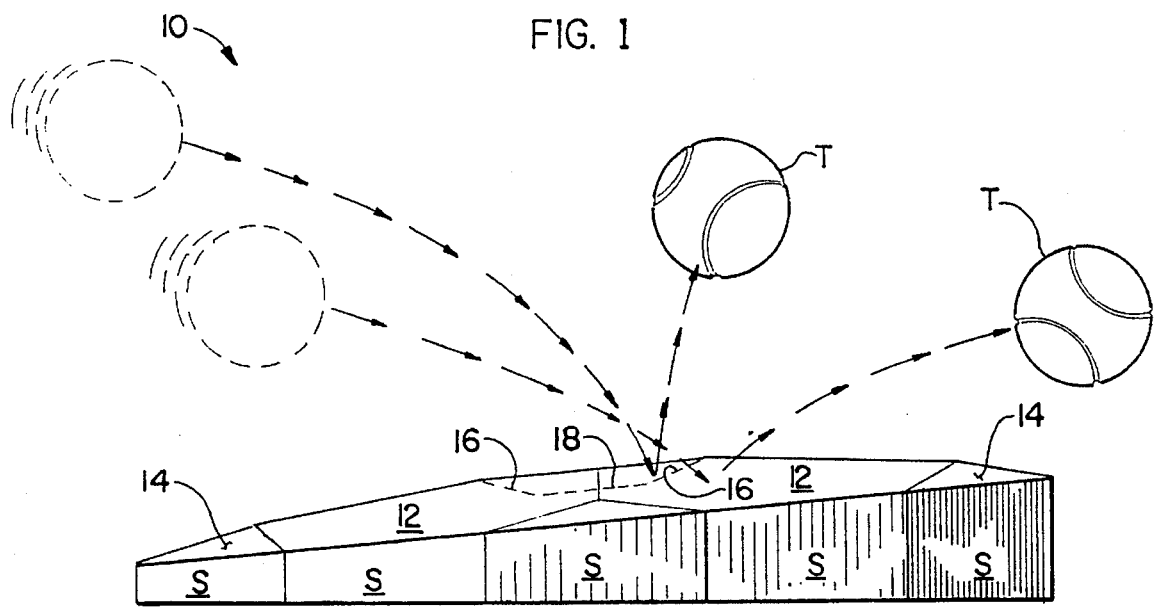
FIG. 2 is a side elevation view of the dog toy shown in FIG. 1 also illustrating several of the many different angles at which a ball will be deflected therefrom.
Figure 3:
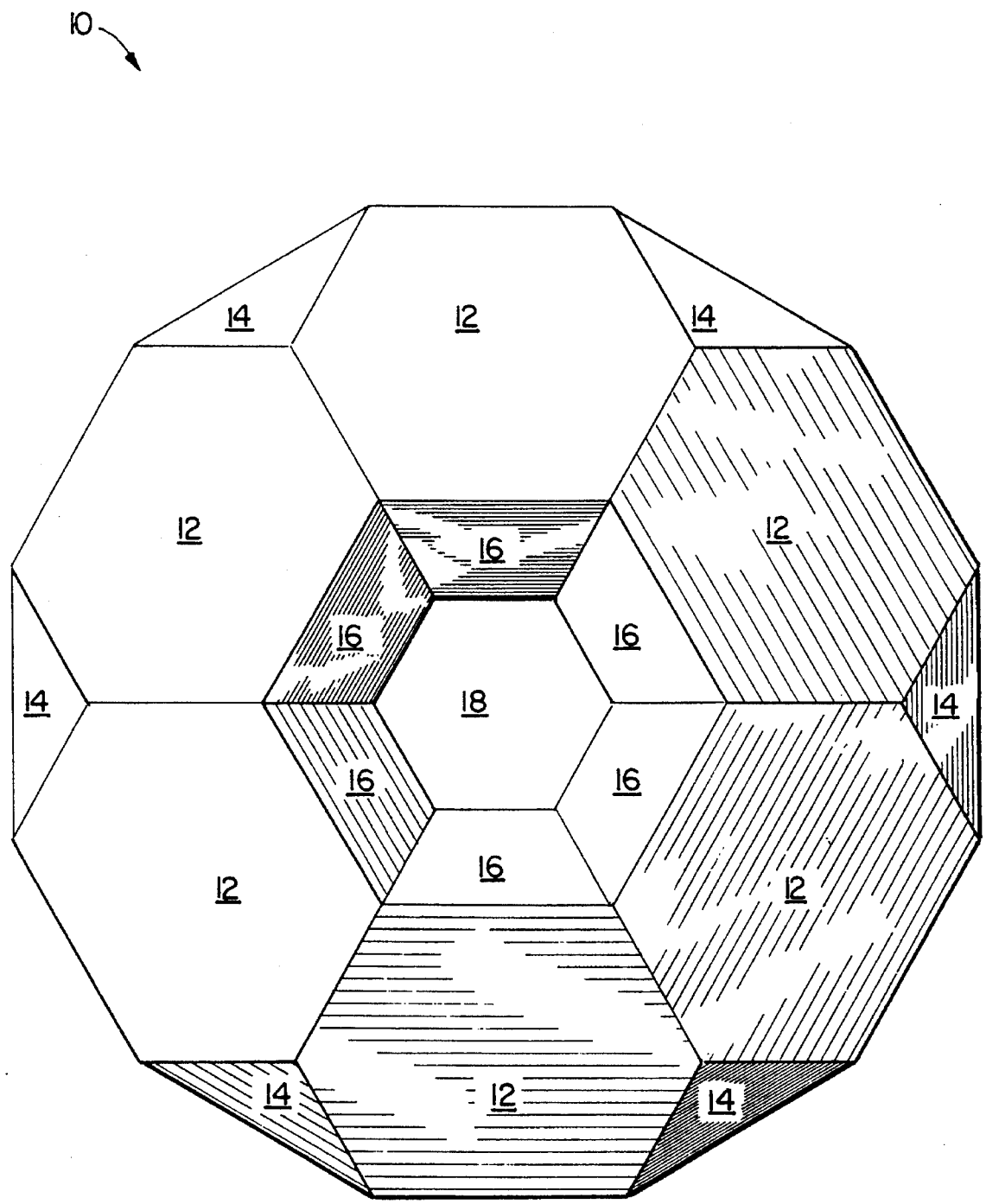
FIG. 3 is a top plan view of the dog toy of the present invention.

Referring now to FIGS. 1–3 of the drawings, the novel dog toy comprising a dog target base element is shown and designated generally as 10. Although the applicant contemplates that ball target base element 10 can be constructed of substantially any rigid material, applicant presently prefers that ball target base element 10 be constructed of plastic or fiberglass due to its' strength and light weight. Although essentially any resilient ball-type object may be thrown against ball target base element 10, applicant believes that tennis balls T and the like are preferable for use in combination with novel ball target base element 10. Although tennis balls T and the like are preferred to be used with ball target base element 10, applicant contemplates that other objects such as rubber balls, non-spherically shaped dog toys, and the like may be used.

Ball target base element 10 has a top surface which is formed from a multiplicity of planar target areas which are each in a different plane than the other planar target areas. Specifically, the surface of ball target base element 10 is formed from six hexagonally shaped and upwardly inclined planar target areas 12, six triangularly shaped and upwardly inclined planar target areas 14, six trapezoidally shaped and downwardly inclined planar target areas 16 and a singular hexagonally shaped and horizontal planar target area 18 located in the center of ball target base element 10. As noted hereinbefore, applicant desires to emphasize that each of the aforementioned planar target elements lies in or defines a separate plane from the other planar target areas so that the entire top surface of ball target base element 10 is formed from 19 planar target areas which are in 19 separate and distinct planes. Thus, ball T when thrown from a single point of origin theoretically has 19 different bounce angles corresponding to the 19 separate planar target areas when ball T impacts ball target base element In addition to hexagonally shaped upwardly inclined planar target areas 12, triangularly shaped upwardly inclined planar target areas 14, trapezoidally shaped downwardly inclined planar target areas 16, and hexagonally shaped horizontal planar target area 18 from which the surface of ball target base element 10 is formed, the ball target base element further includes 12 sides S which depend downwardly from the lowermost edge of the 12 upwardly inclined planar target areas 12 and 14. The 12 sides of ball target base element 10 define 12 additional separate and distinct planes from the 19 different planes defined by planar target areas 12, 14, 16 and 18 from which the top surface of ball target base element 10 is formed. As can be appreciated with reference to the drawings, upwardly inclined planar target areas 12 and 14 form a larger proportion of the top surface of ball target base element 10 than downwardly inclined planar target areas 16 and horizontal planar target area 18.

Also, as seen in FIGS. 1 and 2, ball target base element 10 has a high side and a low side so as to further enhance the unpredictability of the bounce of ball T therefrom to a waiting dog.

In use, applicant's ball target base element 10 provides a predictable bounce to a person throwing ball T against a selected planar target area thereof but an unpredictable bounce to the dog waiting to retrieve ball T when it bounces from ball target base element 10. In other words, the multiplicity of planar target areas 14, 16 and 18 provide a complex maze of surfaces to perplex a fun-loving dog waiting to chase and catch ball T when it bounces from the ball target base element. Therefore, a dog will find playing catch with ball T more exciting than traditional fetch since the dog will not have any idea in which direction or how high ball T will bounce when it impacts ball target base element 10. Due to the unpredictability of the bounce, ball T will appear to a dog as if it is really trying to get away and thereby provide maximum excitement to the dog.

Although applicant contemplates that ball target base element 10 can be manufactured in many different sizes and shapes which could vary from the preferred embodiment shown in FIGS. 1–3 of the drawings and still fall within the intended scope of the present invention, the preferred embodiment of ball target base 10 is about 18 inches wide and about 4 inches high on the high side and about 2 inches high on the low side. Also, although planar target areas 12, 14, 16 and 18 have been shown in a preferred relative proportional size in FIGS. 1–3 of the drawings, applicant further contemplates that the relative proportional size of planar target areas 12, 14, 16 and 18 can be varied and the resulting ball target base element still fall within the intended scope of the present invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. A dog toy for providing an unpredictable bounce to a ball thrown thereagainst and comprising a ball target base element having a generally cylindrical circumference and wherein the top surface defines a plurality of planar target areas each defining a different plane than the others, said plurality of planar target areas including a plurality of generally upwardly inclined planar target areas extending generally toward the central portion of said ball target base element and a plurality of generally downwardly inclined planar target areas located generally in the central portion of the top surface of said ball target base element.

2. A dog toy according to claim 1 wherein said plurality of upwardly inclined planar target areas comprises a plurality of adjacent hexagonal shapes and a plurality of relatively smaller triangular shapes positioned between the bottom portions of said adjacent hexagonal shapes that comprise the preponderance of the top surface area.

3. A dog toy according to claim 2 wherein said upwardly inclined plurality of planar target areas consists of six hexagonal shapes and six triangular shapes.

4. A dog toy according to claim 1 wherein said downwardly inclined plurality of planar target areas comprises a plurality of adjacent trapezoidal shapes.

5. A dog toy according to claim 4 wherein said plurality of adjacent trapezoidal shapes consist of six trapezoidal shapes.

6. A dog toy according to claim 1 wherein the lowermost edges of said plurality of downwardly inclined planar target areas define a horizontally extending planar target area in the center of said ball target base element.

7. A dog toy according to claim 6 wherein said center planar target area comprises a hexagonal shape.

8. A dog toy according to claim 1 wherein said ball target base element comprises a plurality of vertical side surfaces joining said plurality of generally upwardly inclined planar target areas at the lowermost edges thereof to define said generally cylindrical circumference of said ball target base element.

9. A dog toy according to claim 8 wherein said plurality of side surfaces define a high side and a lower side of said ball target base element.

10. A dog toy according to claim 1 wherein said ball target base element is formed of plastic.

11. A dog toy for providing an unpredictable bounce to a ball thrown thereagainst and comprising a ball target base element having a generally cylindrical circumference and wherein the top surface defines a plurality of planar target areas each defining a different plane than the others, said plurality of planar target areas including a plurality of generally upwardly inclined planar target areas extending generally toward the central portion of said ball target base element and comprising the preponderance of the top surface area, a plurality of relatively smaller and generally downwardly inclined planar target areas located generally in the central portion of the top surface of said ball target base element, and a horizontally extending planar target area defined by the lowermost edges of said plurality of downwardly inclined planar target areas.

12. A dog toy according to claim 11 wherein said plurality of upwardly inclined planar target areas comprises a plurality of adjacent hexagonal shapes and a plurality of relatively smaller triangular shapes positioned between the bottom portions of said adjacent hexagonal shapes.

13. A dog toy according to claim 12 wherein said upwardly inclined plurality of planar target areas consists of six hexagonal shapes and six triangular shapes.

14. A dog toy according to claim 11 wherein said downwardly inclined plurality of planar target areas comprises a plurality of adjacent trapezoidal shapes.

15. A dog toy according to claim 14 wherein said plurality of adjacent trapezoidal shapes consists of six trapezoidal shapes.

16. A dog toy according to claim 11 wherein said center planar target area comprises a hexagonal shape.

17. A dog toy according to claim 11 wherein said ball target base element comprises a plurality of vertical side surfaces joining said plurality of generally upwardly inclined planar target areas at the lowermost edges thereof to define said generally cylindrical circumference of said ball target base element.

18. A dog toy according to claim 17 wherein said plurality of side surfaces define a high side and a lower side of said ball target base element.

19. A dog toy according to claim 11 wherein said ball target base element is formed of plastic.

* * * * *